United States Patent
Caskey et al.

(10) Patent No.: US 9,378,464 B2
(45) Date of Patent: Jun. 28, 2016

(54) DISCRIMINATIVE LEARNING VIA HIERARCHICAL TRANSFORMATIONS

(75) Inventors: Sasha P. Caskey, New York, NY (US); Dimitri Kanevsky, Ossining, NY (US); Brian Kingsbury, Cortlandt Manor, NY (US); Tara N. Sainath, New York, NY (US); George Saon, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/561,318

(22) Filed: Jul. 30, 2012

(65) Prior Publication Data

US 2014/0032571 A1 Jan. 30, 2014

Related U.S. Application Data

(63) Continuation of application No. 13/561,148, filed on Jul. 30, 2012, now abandoned.

(51) Int. Cl.
*G06F 17/30* (2006.01)
*G06N 99/00* (2010.01)
*G10L 15/08* (2006.01)

(52) U.S. Cl.
CPC .............. *G06N 99/005* (2013.01); *G10L 15/08* (2013.01)

(58) Field of Classification Search
CPC .......... G06F 17/30648; G06F 17/3069; G10L 15/02; G10L 15/08; G06N 99/005
USPC .................................. 707/748; 704/231, 243
See application file for complete search history.

(56) References Cited

U.S. PATENT DOCUMENTS

| | | | |
|---|---|---|---|
| 7,117,187 B2 | 10/2006 | Agrafiotis et al. | |
| 7,270,546 B1 * | 9/2007 | Adams et al. | 434/178 |
| 7,885,812 B2 | 2/2011 | Acero et al. | |
| 8,086,549 B2 | 12/2011 | Qi et al. | |
| 2009/0171956 A1 * | 7/2009 | Gupta et al. | 707/6 |
| 2011/0142318 A1 | 6/2011 | Chen et al. | |
| 2011/0144991 A1 | 6/2011 | Fousek et al. | |
| 2011/0196870 A1 | 8/2011 | Schmidtler et al. | |
| 2011/0208521 A1 | 8/2011 | McClain | |
| 2011/0218803 A1 | 9/2011 | Ketabdar et al. | |
| 2012/0010869 A1 | 1/2012 | McCarley et al. | |
| 2012/0065976 A1 * | 3/2012 | Deng et al. | 704/256.1 |
| 2013/0185070 A1 | 7/2013 | Huo et al. | |

OTHER PUBLICATIONS

Kaaniche et al. Recognizing Gestures by Learning Local Motion Signatures of HOG Descriptors, IEEE Transactions on Pattern Analysis and Machine Intelligence, 33, 7, 1-12. (Jul. 2011).

(Continued)

*Primary Examiner* — Boris Gorney
*Assistant Examiner* — Kristopher Andersen
(74) *Attorney, Agent, or Firm* — Ryan, Mason & Lewis, LLP

(57) ABSTRACT

A system and an article of manufacture for discriminative learning via hierarchical transformations, which includes obtaining a model of a first set of data, two or more data transformations, and a second set of data, evaluating the two or more data transformations to determine which data transformation will most effectively modify the second set of data to match the model, and selecting the data transformation that will most effectively modify the second set of data to match the model based on the evaluation.

15 Claims, 2 Drawing Sheets

(56) References Cited

OTHER PUBLICATIONS

Rennie et al., Matched-Condition Robust Dynamic Noise Adaptation, 2011 IEEE Workshop on Automatic Speech Recognition and Understanding (ARSU), 137-140. (Dec. 2011).

Loni et al., Latent Semantic Analysis for Question Classification with Neural Networks. 2011 IEEE Workshop on Automatic Speech Recognition and Understanding (ASRU), 437-442. (Dec. 2011).

Povey et al., fMPE: Discriminatively Trained Features for Speech Recognition, in Proc. of ICASSP, 2005, pp. 961-964.

Seide et al., Conversational Speech Transcription Using Context-Dependent Deep Neural Networks, in Proc. Interspeech, 2011.

Hinton et al., A Fast Learning Algorithm for Deep Belief Nets, Neural Computation, vol. 18, pp. 1527-1554, 2006.

Hermansky et al., Tandem Connectionist Feature Extraction for Conventional Hmm Systems, in Proc. ICASSP, 2000.

Grezl et al., Probabilistic and Bottle-Neck Features for LVCSR of Meetings, in Proc. ICASSP, 2007.

Seide et al., Feature Engineering in Context-Dependent Deep Neural Networks for Conversational Speech Transcription, in Proc. ASRU, 2011.

Gales, Maximum Likelihood Linear Transformations for HMM-based Speech Recognition, Computer Speech and Language, vol. 12, pp. 75-98, 1998.

Povey et al., Boosted MMI for Model and Feature-Space Discriminative Training, in Proc. of ICASSP, 2008, pp. 4057-4060.

Saon et al., Penalty Function Maximization for Large Margin HMM Training, in Proc. Interspeech, 2008, pp. 920-923.

Povey, Improvements to fMPE for Discriminative Training of Features, in Proc. Interspeech, 2005, pp. 2977-2980.

Martens, Deep Learning via Hessian-Free Optimization, in Proc. ICML, 2010.

Povey, Discriminative Training for Large Vocabulary Speech Recognition, PhD Thesis, Cambridge University, Jul. 2004.

* cited by examiner

DISCRIMINATIVE LEARNING VIA HIERARCHICAL TRANSFORMATIONS

CROSS-REFERENCE TO RELATED APPLICATIONS

This application is a continuation of U.S. patent application Ser. No. 13/561,148 filed Jul. 30, 2012, and incorporated by reference herein.

FIELD OF THE INVENTION

Embodiments of the invention generally relate to information technology, and, more particularly, to acoustic modeling.

BACKGROUND

For years, the de facto standard in acoustic modeling has been hidden Markov models (HMMs) with state-dependent Gaussian mixture models (GMMs) for expressing the distributions of the acoustic feature vectors within each state. Traditionally, the estimation of the GMM parameters (means, variances, mixture weights) is performed with maximum likelihood via the expectation-maximization (EM) algorithm. There have been advances in the estimation of GMM-HMMs through the advent of discriminative training techniques such as maximum mutual information and minimum phone error (MPE) training. Discriminative training can be carried out either in model space or in feature space as in feature minimum phone error (fMPE), where the goal is to estimate a transform that maps high-dimensional vectors of Gaussian posteriors to time-dependent offsets which are added to the regular acoustic feature vectors. The projection is trained to enhance the discrimination between correct and incorrect word sequences.

The prominence of GMM-HMMs in acoustic modeling has led to an entire ecosystem of front-end processing and speaker-adaptation techniques specifically tailored to maximize the recognition performance under this model. Linear transforms such as the semi-tied covariance (STC) transform and maximum likelihood linear regression (MLLR) are examples of such techniques that were developed in the context of diagonal-covariance GMMs.

Additionally, transformations of feature spaces are common methods to improve pattern recognition accuracy. Examples of features include the following:

in textual processing: term frequency-inverse document frequency (TF-IDF), likelihood scores associated with textual units, etc.;

acoustic features in speech recognition tasks; and color, font, layout, symbols and concepts in image interpretation tasks.

Typically, transformations of feature spaces are carried out as follows. There are features that represent test data X, and there are "meta-features" that represent training data. Features that represent test data are then moved toward "meta-features" that represent features of training data.

By way of example, assume that there is some map of features:

$$F(A,V_1,V_2):\{x_1,x_2,\ldots x_T\} \to \{y_1,y_2,\ldots y_T\},$$

where $V_i$ are subsets of linear spaces, and A is a linear map from a subset $V_1$ to $V_2$. This map A is found via maximization over A for some objective function G over data $\{x_1, x_2, \ldots x_T\}$, the transform $F(A, V_1, V_2)$, and model parameters $\theta$. Also, consider $$\max_A G(F(A, V_1, V_2), \{x_1, x_2, \ldots x_T\}, \theta).$$

The objective function can be a likelihood function or discriminative function (for example, fMPE). Examples can include:

Maximum Linear Likelihood Regression (MLLR). In MLLR:

$$F(A,V_1,V_2):\{x_1,x_2,\ldots x_T\} \to \{y_1,y_2,\ldots y_T\} = \{Ax_1, Ax_2, \ldots Ax_T\}.$$

In fMPE:

$$F(A,V_1,V_2):x_i \to y_i = x_i + A\{g_{i-r}, g_{i-r+1}, \ldots g_{i+r}\}.$$

In the context of fMPE, this means that there are features, a set of Gaussians that represent training data ("meta-features" for training data), and the process of creating posteriors over test features. Then, these posteriors can be projected back to test features (as an offset that is added to test features). The above transformations involve linear projections of high-dimensional vectors of Gaussian posteriors to time-dependent offsets that are added to regular feature vectors. Other examples of transformations of feature data are linear transforms such as semi-tied covariance transform and maximum likelihood regression. However, given these existing approaches, challenges still exist in integration of methodologies and higher pattern recognition accuracy.

SUMMARY

In one aspect of the present invention, techniques for discriminative learning via hierarchical transformations are provided, and include obtaining a model of a first set of data, two or more data transformations, and a second set of data, evaluating the two or more data transformations to determine which data transformation will most effectively modify the second set of data to match the model, and selecting the data transformation that will most effectively modify the second set of data to match the model based on the evaluation.

This aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
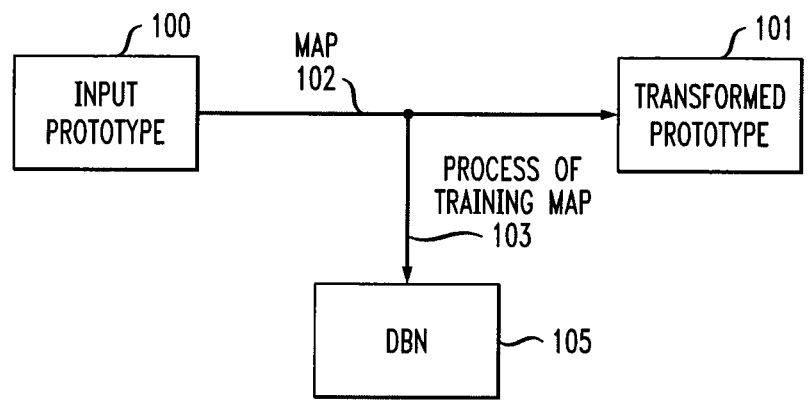
FIG. 1 is a diagram illustrating a learning process, according to an embodiment of the present invention.

As described herein, an aspect of the present invention includes discriminative learning via hierarchical transformations. At least one embodiment of the invention includes transforming new features back to the space of original prototypes so that the features can be sufficiently modeled. The features can include any type of input speech features such as mel-frequency cepstral coefficients (MFCCs), vocal tract length normalization (VTLN), feature space maximum likelihood linear regression (fMLLR), feature-space maximum mutual information (FMMI), etc. The techniques detailed herein can be applied in statistical machine translation, machine transliteration, topic identification, image recognition, semantic processes, vision processing, speech recognition, etc.

Accordingly, aspects of the invention include providing an alternative to the feature-space discriminative transform known as feature-space maximum mutual information (FMMI) (or FMPE depending on the training criterion) that includes a non-linear projection computed by a deep neural network. Like FMMI, the neural network transform takes as input a block of consecutive features and produces a time-dependent offset that is added to the central frame. Unlike FMMI, however, there is no need to have a secondary GMM to compute posterior features; the network can carry out the relevant feature extraction. Also, in at least one embodiment of the invention, the transformation is not factored into separate transforms for posterior projection and temporal context aggregation. "Transform," "posterior projection" and "temporal context aggregation" are acknowledged as concepts that would be understood by one skilled in the art. (For example, see, Povey et al. fMPE: Discriminatively trained features for speech recognition, in *Proc. of ICASSP*, 2005, pp. 961-964.)

Accordingly, at least one embodiment of the invention includes a deep neural network (DNN) architecture that learns time-dependent offsets to acoustic feature vectors according to a discriminative objective function such as maximum mutual information (MMI) between reference words and the transformed acoustic observation sequence. In at least one example embodiment, $y_t = x_t + Mh_t$ is the fMMI transform and $X_t$ is considered the offset. Additionally, DNN is acknowledged as a concept that would be understood by one skilled in the art. (For example, see, Hinton et al. A fast learning algorithm for deep belief nets. *Neural Computation*, vol. 18, pp. 1527-1554, 2006.) Similarly, MMI is acknowledged as a concept that would be understood by one skilled in the art. (For example, see, D. Povey. Discriminative Training for Large Vocabulary Speech Recognition. PhD thesis, Cambridge University, July 2004.)

An aspect of these techniques includes a greedy layer-wise pre-training of the network based on minimum squared error between the DNN outputs and the offsets provided by a linear FMMI transform. Also, as detailed herein, the weights of the pre-trained network are updated with stochastic gradient ascent by back-propagating the MMI gradient through the DNN layers.

As further described herein, at least one embodiment of the invention includes replacing linear transforms with non-linear counterparts computed by multi-layer perceptrons. A perceptron is acknowledged as a concept that would be understood by one skilled in the art. (For example, see, Rosenblatt, Frank (1958), The Perceptron: A Probabilistic Model for Information Storage and Organization in the Brain, Cornell Aeronautical Laboratory, Psychological Review, v65, No. 6, pp. 386-408.) This can be represented, in general, via the following.

Features $\{x_1, x_2, \ldots x_T\}$ are transformed according to:

$$F(R, V_1, V_2 : \{x_1, x_2, \ldots x_T\} \rightarrow \{y_1, y_2, \ldots y_T\},$$

where R is a function of dimension D computed by an L-layer perceptron, which is parameterized by the set of weight matrices $W = \{W_1, \ldots W_L\}$ by alternating matrix-vector multiplication for the weight matrices and component-wise non-linear activation functions.

Additionally, as described herein, at least one embodiment of the invention includes using hierarchical transformations to define a transform that moves test features to a representation of a model training space, which may be in a deep belief network (DBN). DBN is acknowledged as a concept that would be understood by one skilled in the art. (For example, see, Hinton et al. A fast learning algorithm for deep belief nets. *Neural Computation*, vol. 18, pp. 1527-1554, 2006.) The model training set can include, for example, Gaussian posteriors. As also noted herein, transformation of features can be carried out via adding an offset of projection of the representation of the model space. The discriminative feature transform formulation can additionally use deep neural networks (DNNs) trained through MMI gradient back-propagation. The transform may be used for supervised and unsupervised adaptation (wherein supervised adaptation uses label information, and unsupervised adaptation does not).

In accordance with at least one embodiment of the invention, neural network FMMI formulation can be carried out as follows. The acoustic feature vectors $x_t \in \mathcal{R}^D$ are transformed to:

$$y_t = x_t + f(x_{t-\tau}, \ldots, x_t, \ldots, x_{t+\tau}; W),$$

where f is a vector function of dimension D computed by an L-layer perceptron which is parameterized by the set of weight matrices $W = \{W_1, \ldots, W_L\}$ with $W_i$ of size $n_i \times (n_{i-1} + 1)$ where $n_i$ denotes the number of units for layer i. The multilayer perceptron includes three or more layers (an input and an output layer with one or more hidden layers) of non-linearly-activating nodes. Each node in one layer connects with a certain weight to every node in the following layer. f is computed by alternating matrix-vector multiplications for the weight matrices and component-wise non-linear activation functions. More precisely, $u_0$ can be defined as $u_0 = [x_{t-\tau}^T, \ldots, x_t^T, \ldots, x_{t+\tau}^T]^T$, the input to the neural network of dimension $(2\tau+1)D$, and feed-forward networks can be considered with the recursion:

$$v_i = W_i \begin{bmatrix} u_{i-1} \\ 1 \end{bmatrix}$$

$$u_i = \sigma(v_i), i = 1 \ldots L,$$

where $v_i$ is the vector of total inputs, $u_i$ is the output vector, and $\sigma$ is the component-wise nonlinear activation function. Choices for a include, for example, the sigmoid or hyperbolic tangent. A sigmoid curve is produced by a mathematical function having an "S" shape. Often, a sigmoid function refers to the special case of the logistic function shown to the right and defined by a corresponding formula. Also, hyperbolic functions are analogs of the ordinary trigonometric or circular functions.

With this notation, the function computed by the network is given by the values of the output layer, that is, $$f(u_0; W) \triangleq u_L.$$

Additionally, at least one embodiment of the invention includes using a discriminative objective function. An example objective function is given by the mutual information between the transformed acoustic observation sequence $Y = y_1 \ldots y_T$ and the sequence of reference words $W^{ref}$:

$$F(\lambda) \triangleq \log \frac{P_\lambda(Y, W^{ref})}{P_\lambda(Y) P(W^{ref})}$$

$$= \log P_\lambda(Y \mid W^{ref}) - \log \sum_W P_\lambda(Y \mid W) P(W)$$

$$\triangleq F^{num}(\lambda) - F^{den}(\lambda)$$

which is expressed as the difference of log likelihood functions between the reference word sequence $W^{ref}$ and all possible word sequences $W$. The functions $F^{num}(\lambda)$ and $F^{den}(\lambda)$ correspond to the numerator and denominator terms in the objective function, respectively. Each word sequence is weighted by the language model probability $P(W)$.

Additionally, $\lambda = \{\Pi_i, a_{ij}, \omega_{ij}, \mu_{ij}, \Sigma_{ij}\}$ denotes an N-state, M-mixture component per state GMM-HMM including initial state probabilities $\{\Pi_i\}$, state transition probabilities $\{a_{ij}\}$, mixture component weights $\{\omega_{ij}\}$, Gaussian mean vectors $\{\mu_{ij}\}$, and Gaussian covariance matrices $\{\Sigma_{ij}\}$.

At least one embodiment of the invention also includes gradient back-propagation. Because $F(\lambda)$ is a function of the transformed feature vectors $Y = y_1 \ldots y_T$, the derivative can be computed with respect to the set of network weights $W$ using the chain rule:

$$\frac{\partial}{\partial W} F(Y; \lambda) = \sum_{t=1}^{T} \sum_{d=1}^{D} \frac{\partial}{\partial y_{td}} F(Y; \lambda) \frac{\partial y_{td}}{\partial W}.$$

Additionally, the gradient of the objective function with respect to the transformed feature vectors has a direct and an indirect component because the model parameters are also a function of the transformed feature vectors:

$$\frac{\partial}{\partial y_t} F(Y; \lambda(Y)) = \frac{\partial F}{\partial y_t} + \frac{\partial F}{\partial \lambda} \frac{\partial \lambda}{\partial \lambda_t}$$

Further, it can be shown that the direct derivative is:

$$\frac{\partial F^{direct}}{\partial y_t} = -\sum_{i=1}^{N} \sum_{j=1}^{M} [\gamma_t^{num}(i, j) - \gamma_t^{den}(i, j)] \sum_{ij}^{-1} (y_t - \mu_{ij}),$$

where $\gamma_t^{num}(i, j)$ and $\gamma_t^{den}(i, j)$ represent the posterior probabilities of being in state i, mixture component j at time t given the acoustics according to the numerator and denominator models, respectively. The indirect derivative is obtained by differentiating the objective function with respect to the Gaussian means and variances, which are assumed to be estimated with maximum likelihood on the transformed features. The back-propagation recursion at time t can be written as:

$$\frac{\partial F}{\partial u_L} = \frac{\partial}{\partial y_t} F(Y; \lambda(Y))$$

$$\frac{\partial F}{\partial v_i} = \sigma'(v_i) * \frac{\partial F}{\partial u_i}$$

$$\frac{\partial F}{\partial W_i} = \frac{\partial F}{\partial v_i} [u_{i-1}^T; 1]$$

$$\frac{\partial F}{\partial u_{i-1}} = W_i^T \frac{\partial F}{\partial v_i},$$

$$i = L \ldots 1,$$

where "*" denotes component-wise multiplication. Further, the weight matrices can be updated with stochastic gradient ascent with learning rate n:

$$W_i^{(k+1)} = W_i^{(k)} + \eta \frac{\partial F}{\partial W_i}, i = 1 \ldots L.$$

FIG. 1 is a diagram illustrating a learning process, according to an embodiment of the present invention. Step 100 includes inputting a prototype. The fMMI transformation is carried out as $Y_t = x_t + Mh_t$. Here, $h_t$ is a prototype because it is a set of Gaussian posteriors. Step 101 includes generating a transformed prototype belonging to the same space as the original features. As detailed herein, the transformation is carried out as $Y_t = x_t + Mh_t$. Also, step 102 includes mapping the input feature space to a better feature space. For example, space may be deemed better because it is more discriminative against classes. Step 103 includes training the map in a hierarchical manner, and step 105 includes implementing a DBN to learn this map. The map is learned so that it can transform features into a better discriminative space.

Figure 2:
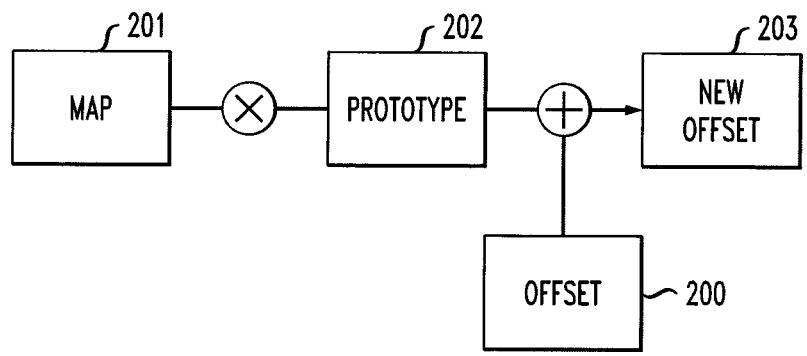
FIG. 2 is a diagram illustrating a process of generating new offset features, according to an embodiment of the invention.

FIG. 2 is a diagram illustrating a process of generating new offset features, according to an embodiment of the invention. By way of illustration, FIG. 2 depicts an original offset 200, a prototype 202, and the map 201 learned in step 105 of FIG. 1 via an objective function associated with the DBN. FIG. 2 also depicts a new offset 203 learned after implementation of the map 201. The offset is the input that feature $x_t$ provided.

Figure 3:
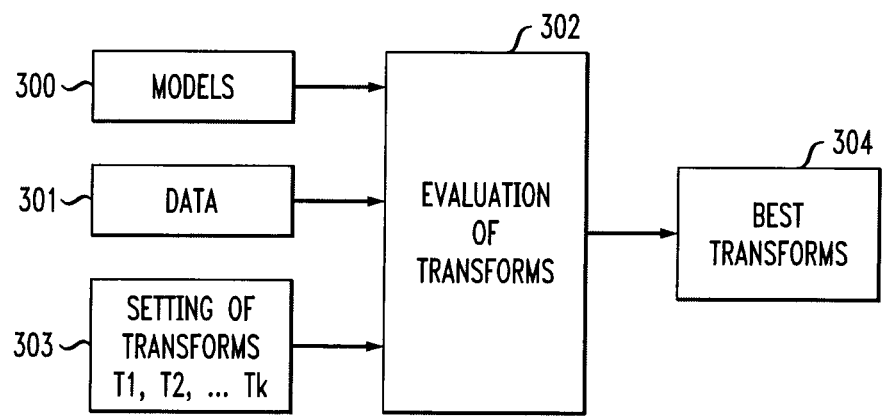
FIG. 3 is a diagram illustrating a process of evaluating transforms, according to an embodiment of the present invention.

FIG. 3 is a diagram illustrating a process of evaluating transforms, according to an embodiment of the present invention. By way of illustration, FIG. 3 depicts a set of models 300 (for example, Gaussian mixture models), a set of data 301 (for example, training data for any tasks, including speech), and a set of transformations 303. Additionally, step 302 includes performing an evaluation of the set of transformations 303 using the models 300 and data 301. An objective function is computed on the training set given the transformed feature/ models, and this is the executed evaluation. Further, step 304 includes choosing a most preferred or "best" transform (that is, the transform with the highest objective value) based on the evaluation.

Figure 4:
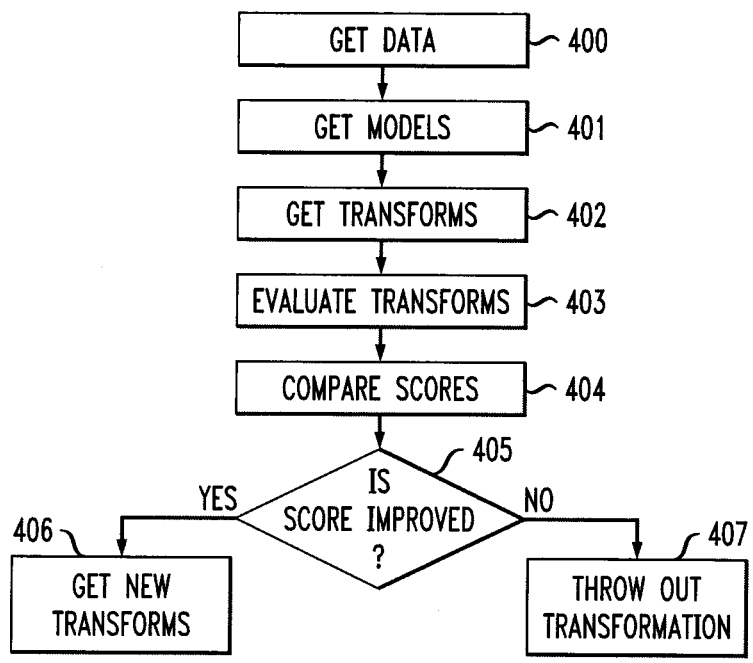
FIG. 4 is a diagram illustrating a process for managing transforms, according to an embodiment of the invention.

FIG. 4 is a diagram illustrating a process for managing transforms, according to an embodiment of the invention. Step 400 includes obtaining data, step 401 includes obtaining models and step 402 includes obtaining data transformations (transforms). The transform M is learned via the fMMI objective function. Step 403 includes evaluating the transforms to produce evaluation scores (via the discriminative fMMI objective function), and step 404 includes comparing the scores. Step 405 includes determining if an evaluation score for a particular transform has improved upon a previous evaluation. If the score has improved, step 406 includes obtaining new transforms. The new transform is used to create new discriminative features via $y_t = x_t + Mh_t$. If the score has not improved, step 407 includes discarding the transformation.

Additionally, in at least one embodiment of the invention, the evaluation score is obtained via hierarchical transformations of data features, wherein the hierarchical transformations include a deep belief network and/or a neural network.

Accordingly, at least one embodiment of the invention includes obtaining a model of a first set of data, two or more data transformations, and a second set of data, evaluating the data transformations to determine which data transformation will most effectively modify the second set of data to match the model, and selecting the data transformation that will most effectively modify the second set of data to match the model based on the evaluation. As detailed herein, the data of the first set of data and the second set of data can include speech data, enterprise data, multimedia data, visual data, biometric data, etc.

Each data transformation includes one or more characteristics associated therewith. The characteristics can include age, gender, entity affiliation (corporate affiliation, organizational affiliation, regional affiliation, national affiliation, etc.), locality, demographic, type of musical instrument, level of education, etc. Additionally, as detailed herein, data transformations move test features from a less discriminative space to a more discriminative space. Further, in at least one embodiment of the invention, the data transformations are hierarchical data transformations, and are used to move test features to a representation of model space.

The techniques detailed herein can additionally include choosing data transformations from a subset of transformations based on an objective function that is associated with a deep belief network. Also, at least one embodiment of the invention includes representing model features via Gaussian posteriors.

Further, at least one embodiment of the invention can include transforming a speech data feature via adding an offset of projections of the representation of model space, wherein the offset of projections is trained by a deep belief network. Also, as described herein, transforming a speech data feature can improve pattern recognition accuracy.

The techniques described herein can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques described can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
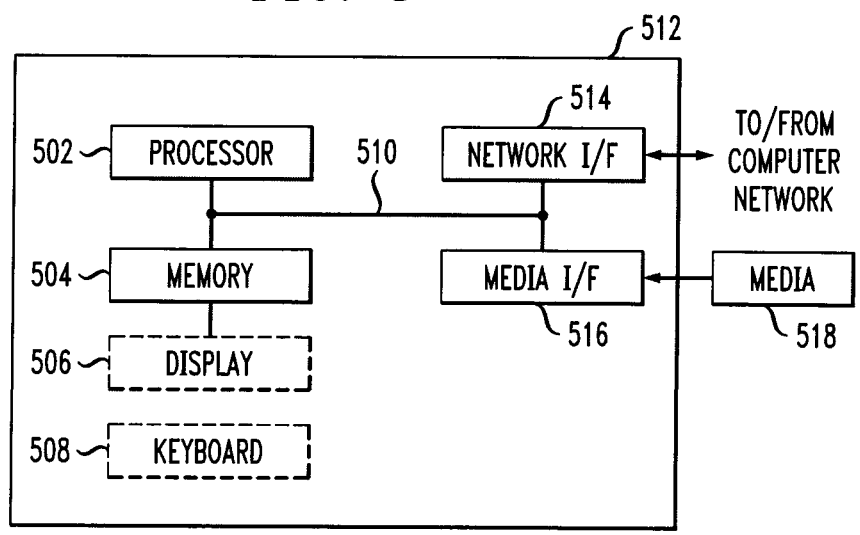
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with to an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, precluding the need to have a secondary GMM to compute posterior features.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:

obtaining (i) a Gaussian mixture model for expressing a distribution of one or more data features, (ii) two or more data transformations, and (iii) a set of training data related to a given speech task, wherein each of the two or more data transformations includes associated characteristics, wherein said characteristics include at least age, gender, entity affiliation, locality, demographic, and level of education;

evaluating the two or more data transformations to determine which data transformation will most effectively modify the set of training data to match the model, wherein said evaluating comprises:

computing a discriminative feature-space maximum mutual information (FMMI) objective function on the set of training data based on (i) the Gaussian mixture model and (ii) each of the two or more data transformations, wherein said objective function comprises a difference of log likelihood functions between a reference word sequence and a collection of multiple word sequences, and wherein each word sequence in the collection of word sequences is weighted by a language model probability;

producing a first evaluation score, based on the discriminative feature-space maximum mutual information objective function, for each of the two or more data transformations; and identifying a given one of the two or more data transformations with the highest first evaluation score;

evaluating, based on the Gaussian mixture model, the identified given data transformation against the set of training data related to the given speech task via the discriminative feature-space maximum mutual information (FMMI) objective function to produce a second evaluation score for the given data transformation;

comparing the second evaluation score of the identified given data transformation to the first evaluation score of the identified given data transformation; and discarding the identified given data transformation if the second evaluation score is lower than the first evaluation score.

2. The article of manufacture of claim 1, wherein the data of the set of training data comprises at least one of speech data, enterprise data, multimedia data, visual data and biometric data.

3. The article of manufacture of claim 1, wherein the first and the second evaluation scores are obtained via at least one hierarchical transformation of at least one data feature.

4. The article of manufacture of claim 3, wherein the at least one hierarchical transformation comprises at least one of a deep belief network and a neural network.

5. The article of manufacture of claim 1, wherein entity affiliation comprises one of corporate affiliation, organizational affiliation, regional affiliation or national affiliation.

6. The article of manufacture of claim 1, wherein the two or more data transformations move test features from a less discriminative space to a more discriminative space.

7. The article of manufacture of claim 1, wherein the two or more data transformations are hierarchical data transformations.

8. The article of manufacture of claim 7, wherein the two or more hierarchical data transformations are used to move test features to a representation of model space.

9. The article of manufacture of claim 1, wherein the method steps comprise choosing the two or more data transformations from a subset of transformations based on an objective function that is associated with a deep belief network.

10. The article of manufacture of claim 1, wherein the method steps comprise representing model features via Gaussian posteriors.

11. The article of manufacture of claim 1, wherein the method steps comprise transforming a data feature via adding an offset of projections of a representation of model space.

12. The article of manufacture of claim 11, wherein the offset of projections is trained by a deep belief network.

13. The article of manufacture of claim 11, wherein transforming a speech data feature improves pattern recognition accuracy.

14. A system for characterizing a set of data, comprising:
a memory; and
at least one processor coupled to the memory and operative for:
obtaining (i) a Gaussian mixture model for expressing a distribution of one or more data features, (ii) two or more data transformations, and (iii) a set of training data related to a given speech task, wherein each of the two or more data transformations includes associated characteristics, wherein said characteristics include at least age, gender, entity affiliation, locality, demographic, and level of education;
evaluating the two or more data transformations to determine which data transformation will most effectively modify the set of training data to match the model, wherein said evaluating comprises:
computing a discriminative feature-space maximum mutual information (FMMI) objective function on the set of training data based on (i) the Gaussian mixture model and (ii) each of the two or more data transformations, wherein said objective function comprises a difference of log likelihood functions between a reference word sequence and a collection of multiple word sequences, and wherein each word sequence in the collection of word sequences is weighted by a language model probability;
producing a first evaluation score, based on the discriminative feature-space maximum mutual information objective function, for each of the two or more data transformations; and
identifying a given one of the two or more data transformations with the highest first evaluation score;
evaluating, based on the Gaussian mixture model, the identified given data transformation against the set of training data related to the given speech task via the discriminative feature-space maximum mutual information (FMMI) objective function to produce a second evaluation score for the given data transformation;
comparing the second evaluation score of the identified given data transformation to the first evaluation score of the identified given data transformation; and
discarding the identified given data transformation if the second evaluation score is lower than the first evaluation score.

15. A method for characterizing a set of data, the method comprising the following steps:
obtaining (i) a Gaussian mixture model for expressing a distribution of one or more data features, (ii) two or more data transformations, and (iii) a set of training data related to a given speech task, wherein each of the two or more data transformations includes associated characteristics, wherein said characteristics include at least age, gender, entity affiliation, locality, demographic, and level of education;
evaluating the two or more data transformations to determine which data transformation will most effectively modify the set of training data to match the model, wherein said evaluating comprises:
computing a discriminative feature-space maximum mutual information (FMMI) objective function on the set of training data based on (i) the Gaussian mixture model and (ii) each of the two or more data transformations, wherein said objective function comprises a difference of log likelihood functions between a reference word sequence and a collection of multiple word sequences, and wherein each word sequence in the collection of word sequences is weighted by a language model probability;
producing a first evaluation score, based on the discriminative feature-space maximum mutual information objective function, for each of the two or more data transformations; and
identifying a given one of the two or more data transformations with the highest first evaluation score;
evaluating, based on the Gaussian mixture model, the identified given data transformation against the set of training data related to the given speech task via the discriminative feature-space maximum mutual information (FMMI) objective function to produce a second evaluation score for the given data transformation;
comparing the second evaluation score of the identified given data transformation to the first evaluation score of the identified given data transformation; and
discarding the identified given data transformation if the second evaluation score is lower than the first evaluation score.
wherein the steps are carried out by a computer device.

* * * * *